United States Patent [19]
Hobbs

[11] Patent Number: 5,953,895
[45] Date of Patent: Sep. 21, 1999

[54] METHOD AND APPARATUS FOR PULLING AND CHOPPING PLANT STALKS

[75] Inventor: Oliver K. Hobbs, Suffolk, Va.

[73] Assignee: Amadas Industries, Incorporated, Suffolk, Va.

[21] Appl. No.: 08/895,832

[22] Filed: Jul. 17, 1997

Related U.S. Application Data

[60] Provisional application No. 60/021,960, Jul. 18, 1996.

[51] Int. Cl.⁶ .................................................. A01D 49/00
[52] U.S. Cl. ........................... 56/500; 56/10.2 G; 171/58
[58] Field of Search .............................. 56/500, 502, 503, 56/6, 7, 10.2 G, 10.2 H, DIG. 9, DIG. 19, DIG. 20, 14.3; 171/58, 55, 50; 172/73, 32, 540

[56] References Cited

U.S. PATENT DOCUMENTS

| 2,553,356 | 5/1951 | Cady . | |
|---|---|---|---|
| 2,660,013 | 11/1953 | Priestley . | |
| 2,940,528 | 6/1960 | Magnuson . | |
| 3,437,152 | 4/1969 | Barrentine . | |
| 3,716,974 | 2/1973 | Wehde | 171/58 X |
| 4,027,733 | 6/1977 | Eisenhardt et al. | 171/58 X |
| 4,183,411 | 1/1980 | Bourquin | 171/58 X |
| 4,350,207 | 9/1982 | Ben-Dor . | |
| 4,370,846 | 2/1983 | Arnold | 56/6 |
| 4,459,796 | 7/1984 | Stokes | 56/14.3 |
| 4,751,812 | 6/1988 | Lubetzky et al. . | |
| 4,965,991 | 10/1990 | Sauder . | |
| 5,354,003 | 10/1994 | Stokes . | |

Primary Examiner—H. Shackelford
Attorney, Agent, or Firm—Burns, Doane, Swecker Mathis, L.L.P.

[57] ABSTRACT

An apparatus for processing plant stalks after harvesting includes a frame structure supported from a ground surface for translatory movement at a predetermined rate and in a predetermined direction along a row of plant stalks and at least one pair of pneumatic tires having their peripheries in pressure contact with each other and thus forming a nip for receiving plant stalks therein. The rotating pneumatic tires are disposed at a predetermined angle relative to the ground surface, and the pair of pneumatic tires being rotated at a predetermined peripheral speed. The predetermined speed of the pneumatic tires is determined by and less than the rate of movement of the frame structure. The nip of the pneumatic tires thereby grasps the plant stalks for a sufficient period of time and for a sufficient distance of movement of the frame structure such that the plant stalks are pulled from the ground surface with their roots substantially attached thereto.

14 Claims, 6 Drawing Sheets

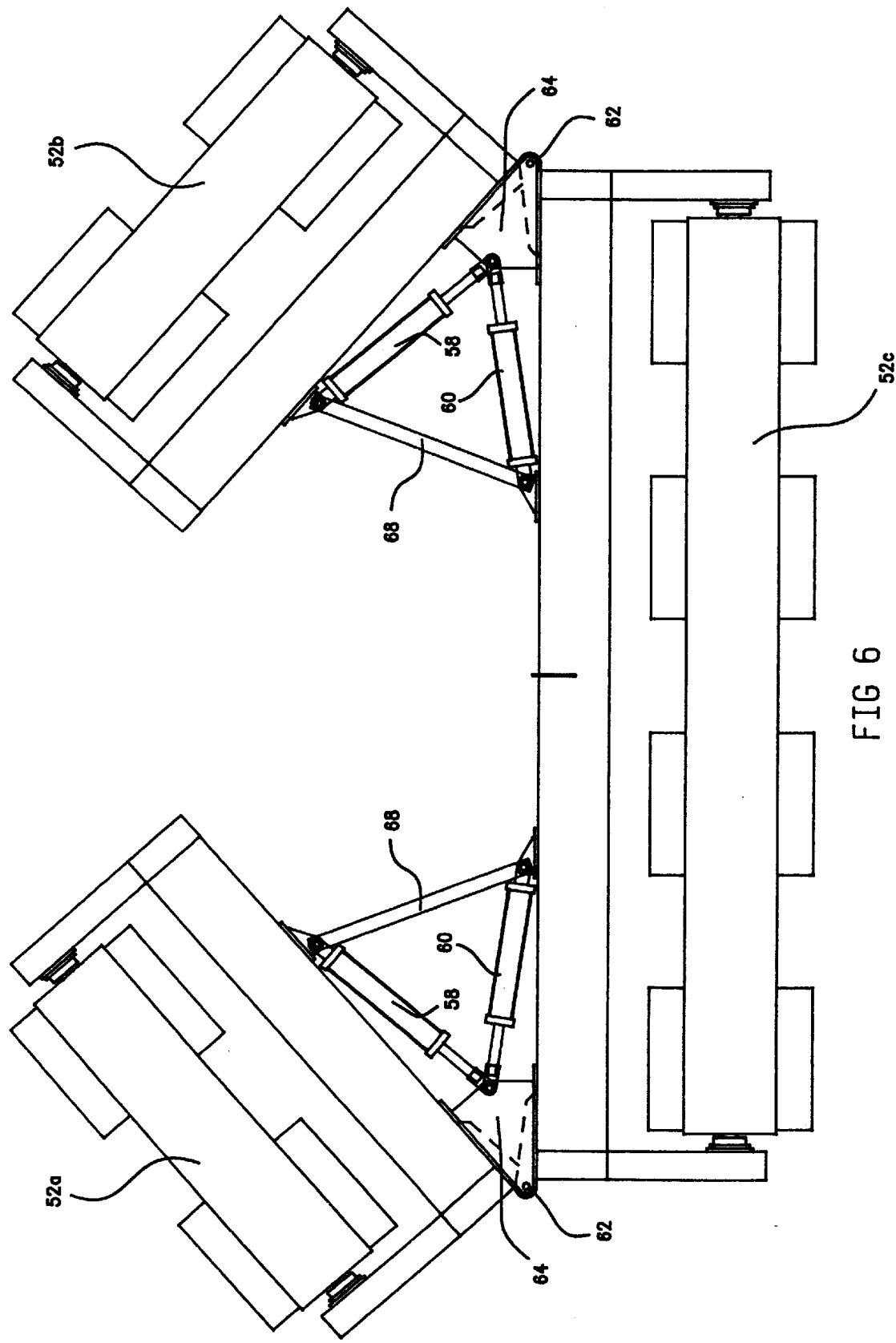

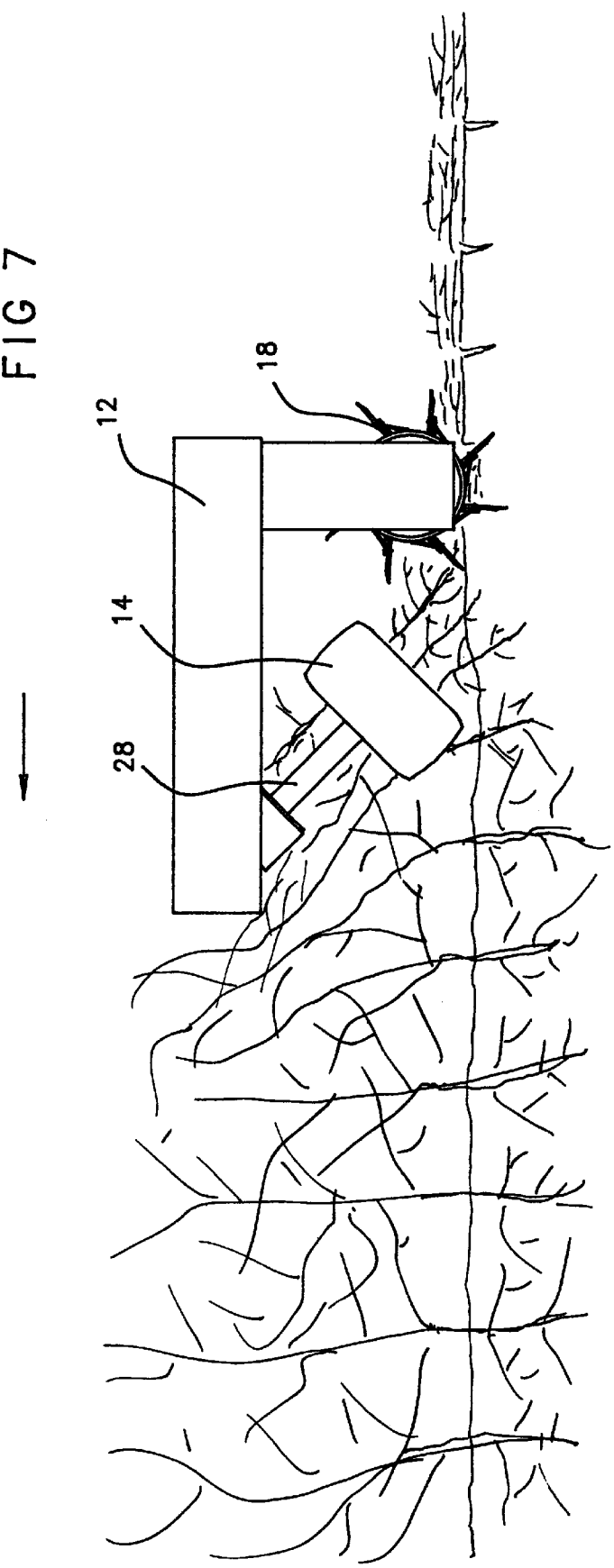

METHOD AND APPARATUS FOR PULLING AND CHOPPING PLANT STALKS

CROSS REFERENCE TO RELATED APPLICATIONS

This application claims the benefit of U.S. Provisional Application No. 60/021,960, filed Jul. 18, 1996, pursuant to 35 U.S.C. § 119(e).

BACKGROUND OF THE INVENTION

1. Field of the Invention

The present invention relates generally to a method and apparatus for pulling and chopping plant stalks, and more particularly, to a method and apparatus for pulling plant stalks and the root system thereof, such as cotton, substantially clear of the ground and then chopping the same.

2. Description of the Related Art

The plant root system and stalk stump portion that remain in the field after various crops have been harvested, and the upper part of the stalks have been cut, may amount to more than fifty percent of the total weight or volume of the plant that was left in the field after the crops were harvested. Plant parasites feed, hibernate and use the root systems as pathways to move down and up as moisture and temperature varies. They will, therefore, survive until another crop is planted in the same or adjacent soil and migrate to the new vegetation. The same applies to crop disease.

In order to reduce or prevent further parasite breeding and hibernation, agronomists and farmers are well aware of the need to expose plant roots to the elements as soon as possible after a crop is harvested. In some areas of this country, plant roots of certain crops must be dug or plowed up by specific dates in order to reduce parasite and disease hibernation, and to qualify for government incentive payments. Although it would be impractical to manually pull any significant amount of the stalks and roots from harvested crops, no efficient mechanical stalk puller has heretofore been available. Therefore, the best farmers could do was to plow up the remaining stalk stumps and root systems with various types of plows or other ground engaging equipment. When plant roots are plowed, however, they may still be buried deeply in the ground and the farmer must still use pesticides and other chemicals to obtain adequate pest and disease control.

Various methods have been used in an attempt to mechanically pull harvested plants from the soil without having to first loosen the soil around the plant root system with some type of ground engaging tool or to dig up a large amount of soil with the roots as with a plow or disk blade, such as shown in U.S. Pat. No. 3,437,152 to Barrentine. None have been entirely successful or widely accepted though, since an implement that might work fairly well on one particular crop or soil condition may not work well at all on other crops or soil conditions.

For example, corn or similar plants with little or no tap root and that have stalks with a soft core are easily pulled from the ground and chopped. Cotton plants, on the other hand, have deep tap roots with both the stalk section extending seven to eight inches above the ground and the root system below the ground level being very dense and tough. The cotton stalk section usually contains as much as sixty percent of the total weight of the plant after the cotton is harvested and deteriorates very little if left standing in the field until spring tillage begins. These stalk sections hinder cultivation, and thus, grass, weeds and other parasite vegetation must be controlled with chemicals. When the following crop to be planted is peanuts or another crop that must be dug from the ground, these stalk sections also cause major problems in harvesting and cleaning.

To further complicate the problem, the population of cotton plants is much higher than that of many other crops and the seed are more difficult to space evenly. Also, since the cotton stalk size varies greatly, the spacing between the plants and other factors will affect the pulling of the stalks from the ground. The force required to pull a single stalk from the ground with roots attached also varies from a few pounds in moist sandy soil to more than a hundred pounds in dry stiff soil. It is not unusual for both of these conditions to exist in a field or even a single row. In order to successfully reduce or prevent parasite and disease hibernation, those stalks that require force within the higher range must be pulled in a manner to prevent the root system from breaking away from the upper stalk as it is pulled from the ground.

Once the cotton or other plant stalk and root system is pulled from the ground, it is also desirable to chop, grind or crush the vegetable matter in order to further condition the stalks for decomposition so that they can be returned to the soil as humus without causing the above-mentioned problems or promoting parasite and disease hibernation.

Depending on soil type, moisture and many other factors, dirt attached to the root systems of each pulled-up cotton stalk varies from a few grams to several pounds. The amount of soil left attached to the roots after being pulled can be reduced by increasing the rate of ground travel. It is impossible, however, to remove enough soil from the root sections to make grinding with conventional equipment feasible. Chopping or grinding and plant root exposure to the elements is enhanced by removing as much dirt as practical.

Rotary and flail type cutters are used extensively to cut the non-abrasive top sections of a wide variety of plants. The cutting edges on these machines operate at high speed to sever grass, weeds, forage crops or other plants by impact at the desired height above soil surfaces. Should these cutting edges be allowed to touch the soil, they will become dull very quickly. When the cutting edges become dull, they will no longer sever plants on impact, performance deteriorates and power consumption soars beyond acceptable levels. Soil attached to plant roots after they are pulled from the ground is very abrasive and will wear cutting edges very rapidly. When an attempt is made to grind pulled-up cotton stalks with roots attached, cutting edges on the high speed blades become dull within minutes, all cutting ceases, and the cutting or grinding machine becomes plugged and inoperative.

Cutters such as that shown in U.S. Pat. No. 4,350,207 to Ben-Dor are examples of the above described conventional machinery which have been used for many years. It should be realized, however, that prior art choppers were used for cutting primarily only the upper stalk sections. Even though these choppers did not handle the heavy roots remaining in the ground, many problems were still associated with these type of choppers, especially when used for cutting cotton and similar plant stalks. They were, however, simple choppers and the power requirement was relatively small, which allowed them to be pulled by draft animals without the need for external power transmission drives. Since these choppers replaced vast amounts of manual labor, the requirement for disconnecting, cleaning, sharpening and servicing them frequently was not considered a major factor in years past. Conditions and machinery are quite different today, however, since machines operate at as much as ten times the ground speed and cover eight or more times as many rows, thus presenting today's machinery with new factors to be considered and problems to be solved. For example, although cotton stalk limbs normally have a soft pith core and are comparatively brittle when dry, the root and lower main stem are as tough as maple or similar hardwood saplings of comparable size, which further aggravates the use of prior art choppers with modern machinery. When tough material such as the part of the cotton stalks above ground level is cut by rolling choppers, the cut sections tend to wedge between the chopper blades. Blades on prior art rolling chopper cylinders were, therefore, normally mounted at two or more points in a manner to leave a center area between blades open so that part of the chopped material could pass through and reduce wedging between adjacent blades. This worked well on corn and other soft or fragile stalks when the roots remained in the ground and the volume of chopped material is not too great. When ground engaging rolling choppers of this type were used to cut cotton stalks, however, material accumulated within the center cavity of the rotor and had to be extracted manually. This is a very difficult and time consuming task. Operators of modern tractors or machines, many of whom have more power under their control than hundreds of draft animals would ever produce, will generally not leave a comfortable seat in a climate controlled cab and clear a plugged rolling cutter more than once or twice before the machine would be declared inappropriate for the job. Further, for the reasons discussed above, it is also desired to chop the complete plant stalks with the roots attached, a task which is much more difficult and must address many other factors not confronted by the rolling choppers of the prior art.

Additional concerns related to pulling and grinding plant stalks, which have not been adequately solved by the prior art, include the soil attached to the root systems of pulled stalks causing the cutting edges of high speed blades to wear away very quickly; flying stalk particles, when propelled at high speed by the cutter blades, puncturing the pneumatic tires when a high speed cutter is operated in association with the puller; complexities in conveying and feeding the pulled stalks into an attached cutter or hammer-mill; and difficulty in mechanically lifting the stalks, the heavy center section of which lies in a straight line and conveying them into a grinding or cutting device after they are discharged to the ground from the puller.

A further concern with prior art stalk pullers and choppers is being able to transport the machine from one field to another over public roads. Implements such as plows, row bedders, planters, and cultivators are mounted on standardized tractor three point hitch systems. These systems allow operators to have precise control over implement position, operating depth and row alignment. Tractor mounted implements are lifted and carried by the tractor at the end of one row, and then transported to another field. Wide mowers, disk harrow and many other farm implements do not need to be closely aligned with a row pattern. These machines extend too far behind the tractor to be lifted so they are usually mounted on wheels and trail behind the tractor. The end sections of these machines must, however, be folded when transported over public roads because of their great width. Several prior art systems have been used for retracting or folding the end sections of such wide implements. Planters or similar light weight implements with seed or similar hoppers employ long positioning arms to stack end units above those mounted on a center tool bar. This system cannot be used in applications where the machine components are comparatively heavy or subject to sever stress. Thus, the end sections of heavy implements, having no hoppers filled with seed or other materials, are usually upended vertically to reduce the width for transport since rotating a heavy load more than ninety degrees with a single hydraulic cylinder is seldom feasible.

Accordingly, there is a great need for an apparatus to pull and grind plant stalks after harvesting, in particular, cotton stalks and other plants having deep root systems. There is a need for the apparatus to operate efficiently day after day under most conditions without plugging and without the operator having to leave his seat to service or adjust the machine, and for the apparatus to be transportable across public roads.

SUMMARY OF THE INVENTION

Accordingly, it is an object of the present invention to provide a stalk puller and chopper that overcomes the disadvantages of the prior art.

The present invention achieves this and other objects through the provision of an apparatus for pulling and chopping plant stalks after harvesting. The apparatus includes a frame structure supported from a ground surface for translatory movement at a predetermined rate and in a predetermined direction along a row of plant stalks and at least one pair of pneumatic tires having their peripheries in pressure contact with each other and thus forming a nip for receiving plant stalks therein. The rotating pneumatic tires are disposed at a predetermined angle relative to the ground surface such that a lower portion of the nip precedes an upper portion of the nip during movement of the frame structure. The pair of pneumatic tires is rotated at a predetermined rotation speed, the nip of the pneumatic tires thereby grasps the plant stalks for a sufficient period of time and for a sufficient distance of movement of the frame structure such that the plant stalks are pulled from the ground surface with their roots substantially attached thereto.

A chopper assembly may also be drivingly connected and disposed in alignment with the at least one pair of pneumatic tires. The chopper assembly chops the plant stalks after they are pulled from the ground. The chopper assembly also engages the ground surface during movement of the frame structure and thereby provides rotational drive to the pair of pneumatic tires. In a preferred embodiment, the predetermined rotation speed of the pneumatic tires is less than the predetermined rate of movement of the frame structure.

The present invention thus provides a chopper assembly or rotor with attached ground engaging blades that may be rolled across the pulled stalks with enough pressure to cut them. Also, since the rotor of the present invention operates much slower than high speed rotary, flail or hammer type blades, it is possible to design the rotor using blades made of plowshare type steel that would be self-sharpening, have long service free life and offer other advantages as well.

The present also provides a mechanism to allow for transporting of a wide apparatus over public roads. In this instance, the rotor assembly includes a center section and at least one end section hingedly connected thereto. A rotating mechanism is provided for rotating the end section about a hinge more than ninety degrees relative to a horizontal plane of the center section, in order to thereby obtain a transport position disposed substantially over the center section. Preferably, the rotating mechanism rotates the end section approximately one hundred forty degrees.

BRIEF DESCRIPTION OF THE DRAWINGS

These, and other, objects, features and advantages of the present invention will become more readily apparent to those skilled in the art upon reading the following detailed description, in conjunction with the appended drawings, in which:

FIG. 6 is a rear view thereof, shown in a transport position; and

FIG. 7 is a schematic illustration of plant stalks being pulled and chopped by the apparatus of the present invention.

DETAILED DESCRIPTION OF THE PREFERRED EMBODIMENTS

Figure 1:
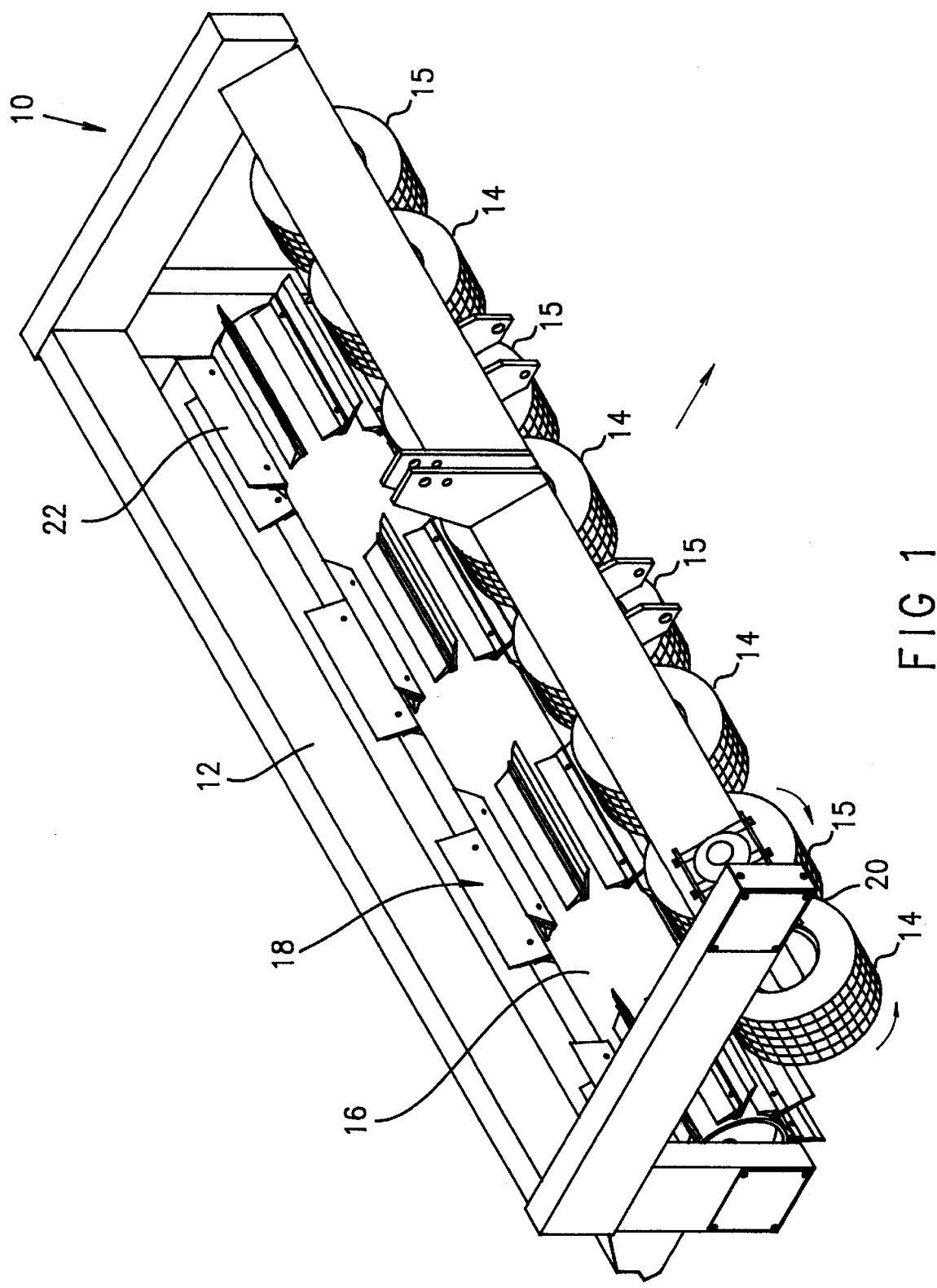
FIG. 1 is an isometric view of a first embodiment of a stalk puller and rolling chopper in accordance with the present invention.
Figure 2:
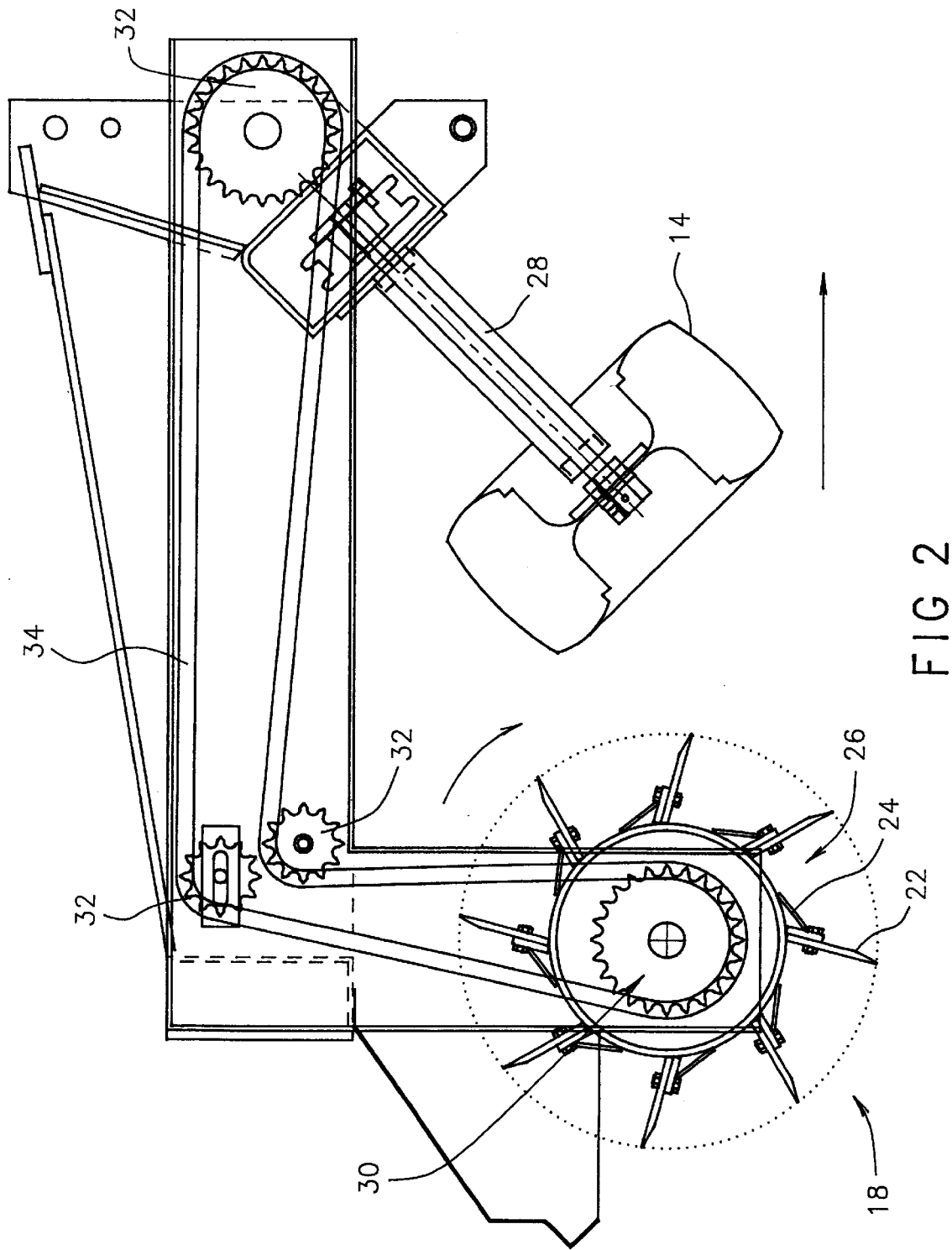
FIG. 2 is a partial sectional end view thereof showing the chain drives within frame members from the rolling chopper to a right angle gearbox through which the puller wheels are driven.
Figure 4:
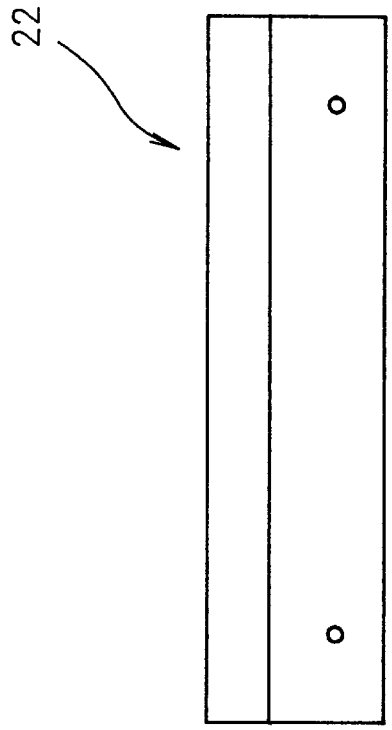
FIG. 4 is a top view of a cutter blade.

Referring to FIG. 1, a stalk puller and rolling chopper apparatus according to the present invention is shown generally by reference numeral 10. Apparatus 10 includes a tubular machine frame 12 which supports a plurality of pairs of rotating tires 14, 15 and a rolling chopper cylinder 16. One pair of rotating tires 14, 15 is provided for each row of stalks to be pulled, with an aligned chopper 18 disposed therebehind. Tires 14, 15 preferably have a six inch or eight inch side wall and a diameter of approximately thirty-two inches, although other suitable diameter tires could of course also be used. FIG. 1 illustrates a four row unit, to which similar two, three or four row units may be attached to each side and folded up for transport, as discussed in further detail below. Apparatus 10 is preferably manufactured in two, four, six, eight, ten and twelve row models. As shown in FIG. 2, the drives for the tires 14, 15 and the choppers 18 are preferably totally enclosed within the tubular machine frame 12. Each pair of rotating tires 14, 15 and aligned chopper 18 has its own drive system and provisions are provided to allow each folding unit to follow the contour of terraced or irregular land.

The apparatus 10 is attached to the standard three point hitch of any tractor through the ASAE standard hitch members provided. When aligned with the stalk rows, the apparatus 10 is lowered to the ground and is towed down the rows with the tractor.

As the apparatus 10 moves down the rows, the stalks are bent forward due to the rotation speed of the tires 14, 15 being less than the ground speed of apparatus 10. The stalks are aligned with the nip or pinch point 20 between the rotating tires 14, 15. As the apparatus moves further forward, rotation of tires 14, 15 causes the stalks and their limbs to be gathered and firmly engaged between the compressed tires 14, 15, which are preferably pneumatic. As the tires 14, 15 rotate, they provide a pulling force on the stalks causing the roots to be pulled from the ground. The ground travel speed of apparatus 10 is greater than the rotation speed of the pneumatic tire tread; therefore, the distance that the stalks are pulled from the ground is much more than the distance they would be pulled if the tire perimeter moved as fast as ground speed. The dry and brittle cotton stalks are pulled from the ground without breaking the upper stalks from the roots.

More particularly, the pairs of pneumatic rubber tires 14, 15 are set at a predetermined angle relative to the ground, preferably forty-five degrees, and compressed by their frame mounted position to the manufacturer's rated load to provide maximum traction at the nip 20 as well as the largest possible area of contact. More particularly, in a preferred embodiment tires 14, 15 have a six or eight inch tread width and a diameter of eighteen inches. Thus, for each of the radial tires having 18"×9.5"×8" dimensions, it will have an 18" outside diameter, a 9.5" tire width, and an 8" wheel rim diameter. The tread width is calculated as being the given 8" tread width plus each side wall bulging approximately 0.75" for a total tire width of 9.5". When each of the tires is inflated to its recommended pressure and compressed one inch, it will exert pressure against its spindle shaft slight less than its rated load capacity. The side walls of the tires are actually little more than 3.5" after the tire bead drops into the rim, and they are approximately one inch less after being compressed. Thus, when a pair of eighteen inch tires are compressed two inches, one inch per tire, the overall width is thirty-four inches. When set up for thirty-four inch rows, therefore, the uncompressed side of the tires would touch the uncompressed surface of adjacent pairs. An apparatus 10 can, however, be set up with all sides of adjacent wheels compressed one inch for thirty two inch row spacing.

Referring also to FIG. 7, the tires 14, 15 are rotated at a speed that will cause the tire perimeter to move slower than ground speed of the apparatus, i.e., the ground speed of the tractor. As the apparatus 10 is operated over harvested plants, rotation of the tires 14, 15 cause the stalks to be gathered and flow therebetween. Pressure from the pneumatic tires 14, 15 holds the stalks as they move through the tire contact area or nip 20. A combination of forward movement of the apparatus 10 relative to the ground plus the rotation of the tires 14, 15 at an inclined angle applies adequate force over enough distance and for a sufficient period of time such that the roots are pulled completely from the ground. In a preferred embodiment for cutting cotton stalks, the ground speed of the apparatus 10 will be approximately ten to twelve miles per hour and the tread rotation speed of the tires 14, 15 at the nip 20 will be approximately 6.2–7.4 mph, or approximately sixty-two percent of the ground speed. The most efficient tire tread to ground travel ratios may be as low as fifty percent on some crops or as high as seventy-five percent on others. The most efficient ratios depend on the root and stalk characteristics of the plants being pulled, however, the above ratios for cotton plants have been found to be a satisfactory compromise for all types of plants.

Since the stalks are already leaning forward, therefore, they are engaged and move between the tires 14, 15 generally parallel to the tire axle shaft 28 at an angle of approximately forty-five degrees relative to the ground in the preferred setup for cotton. The plants are toughest near and below the ground and the angle of pull does not cause them to be snapped from the roots. Other advantages of the stalks flowing between the tires parallel to the wheel axle shaft include spreading the traction over a longer section with little or no angulation in the weaker upper section of the stalk. When closely adjacent small and large stalks pass between the compressed pneumatic tires, adequate force is applied to both stalks over a substantial portion of their length to assure that the smaller stalk does not slip through any area of lowered traction that might be present closely beside the larger.

In the above described configuration, when the first cotton stalk root system is broken loose from a row of typically spaced plants, the soil is also loosened around the adjacent plant that will be pulled next. The angle of pull at ground level as well as the force required to pull the root system is, therefore, decreased relative to the first plant pulled throughout the row length. Several plants are usually being pulled progressively though simultaneously which also reduces pulling force required to pull a single stalk when pulled individually. The combination of angular lifting force from the pulling wheels 14, 15 plus forward ground movement and other features described herein allow virtually all stalks with attached root systems to be lifted from the ground efficiently at speeds that range from creeping to the fastest speed an implement can be safely operated in a field.

It should be realized that since the root systems of cotton and similar plants are deep in the ground and the contact area between tires that can be used within the space between rows is limited, should the tires operate fast enough to cause the force on the plants to pull them out of the ground substantially straight up, then they would not be lifted far enough to clear the ground as desired. Since the stalks are already bent forward by the frame member, they would also likely be bent sharply at the lowest area of engagement by the tires and many of them would be snapped off by the angular forces applied. The apparatus 10 of the present invention can optimally perform with a ground speed of approximately 11–12 miles per hour, with an average capacity of 10 acres per hour with a four row model. The power required to operate an eight row apparatus under very sandy or stiff land conditions at this speed may exceed 200 hp, with an increased average capacity of eighteen acres per hour. The average efficient operating row center tolerance is approximately eight inches, with four inches being provided on each side of the plant row center. The tires 14, 15 of apparatus 10 are preferably aligned for thirty-six, thirty-eight, or forty inch row spacings; however, it should be obvious to one skilled in the art that any desired row spacing could, of course, be provided.

Figure 3:
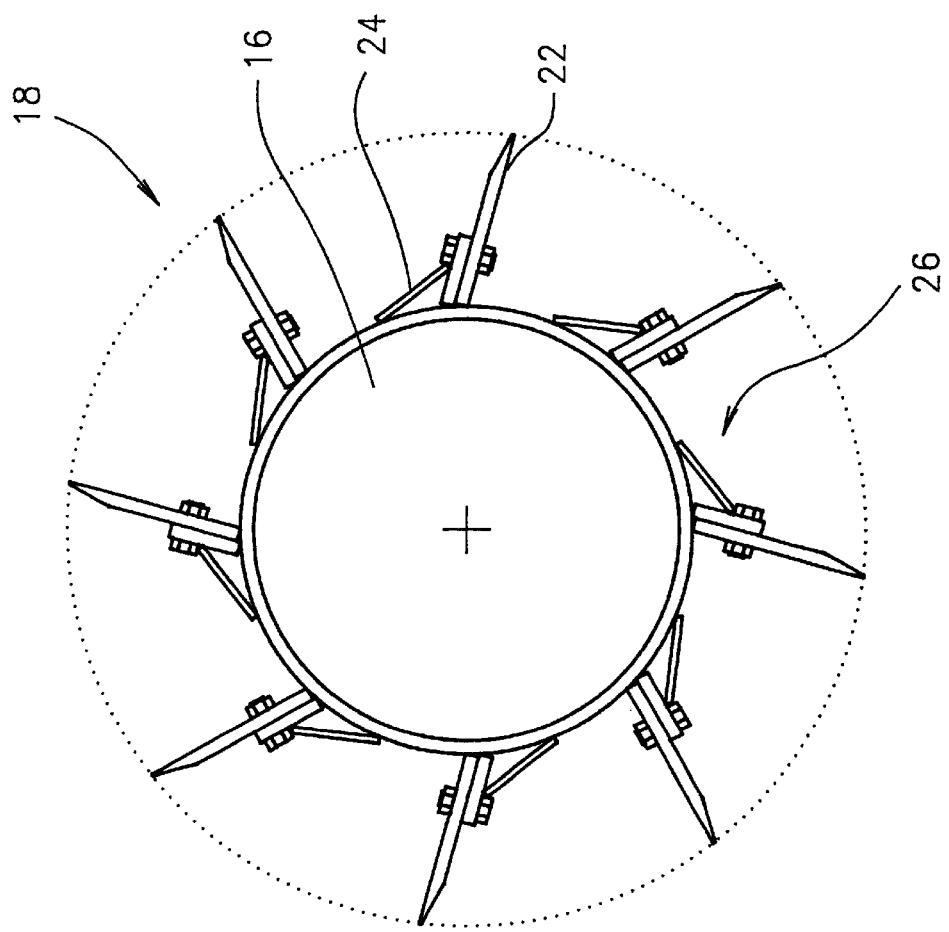
FIG. 3 is an end view of the rolling cutter assembly.

As the roots of the stalks clear the ground surface, the root section is engaged by rolling chopper cylinder 16. As shown more clearly in FIGS. 2 and 3, cylinder 16 includes a cutter rotor section or chopper 18 for each row of stalks that apparatus 10 is built to pull and chop. Chopper 18 has a preferred width of approximately twenty inches and is centered and aligned directly behind the nip 20 of each pair of rotating tires 14, 15. Each chopper 18 includes a plurality of chopper blades 22 that are attached to the enclosed cylinder 16 and that serve as a depth gauge for the choppers 18, as well as the tires 14, 15. The blades 22 have a preferred depth of approximately five inches or six inches, which allows for blade wear. The tap roots of the plant will clear the ground surface while the upper stalk sections are still held between the pneumatic tires 14, 15, such that rotor blades 22 engage and chop the roots and pull the upper section under the rotor 16 when it is released from the puller tires 14, 15. The stalks and roots are chopped in sections short enough to promote deterioration and better seed bed preparation with standard implements.

Rotors are used to crush clods and mash vegetable matter into the soil in preparing a seed bed for planting but the open center design typical of rolling choppers used in the past hindered this process. If equipped with sharpened blades and enough pressure was applied to cut the root and lower sections of pulled up cotton stalks, the center cavity within the blades of prior art rotors would become packed with stalk sections and the cutting action would cease in minutes. Unlike the rolling cutter assemblies of the prior art, chopper 18 does not have an open space which would allow material to collect and form a packed plug of cut stalk sections, which would cling together and eventually accumulate until the blades stopped performing. Space between blades must always be free of all matter for the vegetation and soil to be chopped.

The rotor or chopper 18 of the present invention runs clean under virtually all conditions. As the pulled stalks are engaged by the blades 22 of cutter rotor assembly 18, they are pressed into the plant bed, such as the ground surface, until enough resistance from the soil causes them to be severed. As the rotor 18 progresses over the cut section, the leading end of the severed stalk is pressed against blade holder and deflector assembly 24. This action holds the following stalk section in a favorable angle for it to be severed. After it is cut, the trailing end of the stalk section is pressed closer to the rotor center in the region 26 and the cut section is free to leave the rotor assembly with no resistance.

The blade angle of blades 22 is set to provide the most favorable chopping angle. Blades 22 are formed and set at an angle relative to the chopper cylinder 16 that allows them to penetrate the ground and sever the stalks with minimum resistance, drag or plant bed deformation. This assures longer blade service life as wear is minimized and that which does occur is in a flat plane relative to the flat side of the blade 22.

The blades 22 are also self-sharpening and remain sharp throughout their useful life without manual grinding. Conventional ground engaging rolling blades, when used for chopping, soon wear such that the angle from each side of the cutting edge becomes too blunt to cut vegetable matter without frequent grinding. Since the blades 22 of chopper 18 penetrate the ground in such a manner that any wear that does occur is in a flat plane relative to the flat side, that side of the blade 22 wears flat. As the apparatus 10 moves down the row, the beveled side of the blade engages the plant bed that was loosened when the blade penetrated. This engagement stabilizes the path of the following blade as it chops the stalk sections and penetrates the ground. It lightly sweeps across the soil on the way up when the beveled side is continuously honed. The blades stay very sharp at the cutting edge and the beveled edge retains virtually the same acute angle throughout its service life.

The blade service life is exceptionally good. Due to the continuous blade honing rotor design, none of the blade material is lost that grinding would remove. The most favorable cutting angle relative to rotor diameter and controlled depth of cut assures minimum blade pressure, therefore, blade wear is less. These features also allow the use of wear resistant plowshare steel with excellent shock resistance that virtually eliminates gaping and breaking by rocks or other hard objects.

Referring to FIG. 2, the apparatus 10 is preferably ground driven, such that the ratio of the ground speed to the rotation of the tires 14, 15 remains substantially constant throughout all operating speed ranges. More specifically, as the apparatus 10 is towed down the rows by the tractor, the blades 22 of the chopper 18 are engaging the ground surface, thereby causing chopper 18 to rotate. As chopper 18 rotates, a conventional drive arrangement 30 disposed within cylinder 16 transmits the rotational force through a series of gears or sprockets 32 and a belt or chain drive 34 to the axle or spindle shaft 28 for the tires 14, 15, which in turn causes rotation thereof. One of two sprockets on the spindle 28 for the first pair of tires 14, 15 is driven by a sprocket on the right angle gearbox output shaft, a second sprocket on the first spindle shaft 28 drives a first sprocket on the spindle for the second pair of tires 14, 15, and the procedure is repeated to each pair of wheels used. Only one tire of each pair of tires 14, 15 is driven by the drive arrangement 30. The other tire of each pair of tires 14, 15 is an idler that is driven by the traction from the driven tire. This system allows all drive spindles to be driven in the same directions and a simple drive system can be used. All drives are protected by a torque limiter and totally enclosed within the frame. In an alternative embodiment, each pair of tires may be driven through individual gearboxes. This uses a single chain drive as shown in FIG. 2 which drives a horizontal shaft that passes through each gearbox.

Should it be desirable to pull stalks and remove them from the fields without cutting, the rolling chopper can be replaced by ground engaging wheels to drive the stalk puller wheels 14, 15. The puller wheels can also be driven by a tractor power take off (PTO), hydraulic motors or by other means, however, it is necessary to synchronize ground to puller wheel speed for best performance and this synchronization must be maintained at all times (i.e., the PTO speed is relative to the tractor speed). If driven from the ground driven rolling chopper or ground wheels, as shown in FIG. 2, the ratio remains constant throughout the range of engine speeds or gear selection the operator chooses to operate.

When the chopper is not used and the puller wheels are powered by ground driven wheels, a tractor PTO or other power source, rod guides may be used to cause two rows to be placed in a single windrow or to be placed in individual rows.

Although not shown, the apparatus 10 may also be equipped with one or more weight boxes, each designed to accommodate sand, iron, or other dense material when additional weight is required for heavy stalk cutting. The weight box(es) may be centered or one disposed on each end of the apparatus.

The apparatus 10 may also include a row centering coulter and rotating disk guides that move lodged stalks in line with the blades of the chopper.

As mentioned above, the apparatus 10 is preferably manufactured in two, four, six, eight, ten and twelve row models. An apparatus which is designed to work eight rows, each row being planted on three foot centers, is therefore at least twenty-four feet wide, and is too wide to be transported over public roads. If the end sections of apparatus 10 were rotated ninety degrees from horizontal, as in the prior art, the resulting overall width of an eight-row apparatus for thirty-six inch rows would be 18.67'. If the end sections were rotated one hundred forty degrees, however, the resulting width would be reduced to 15.58' and a more stable configuration would be obtained.

Figure 5:
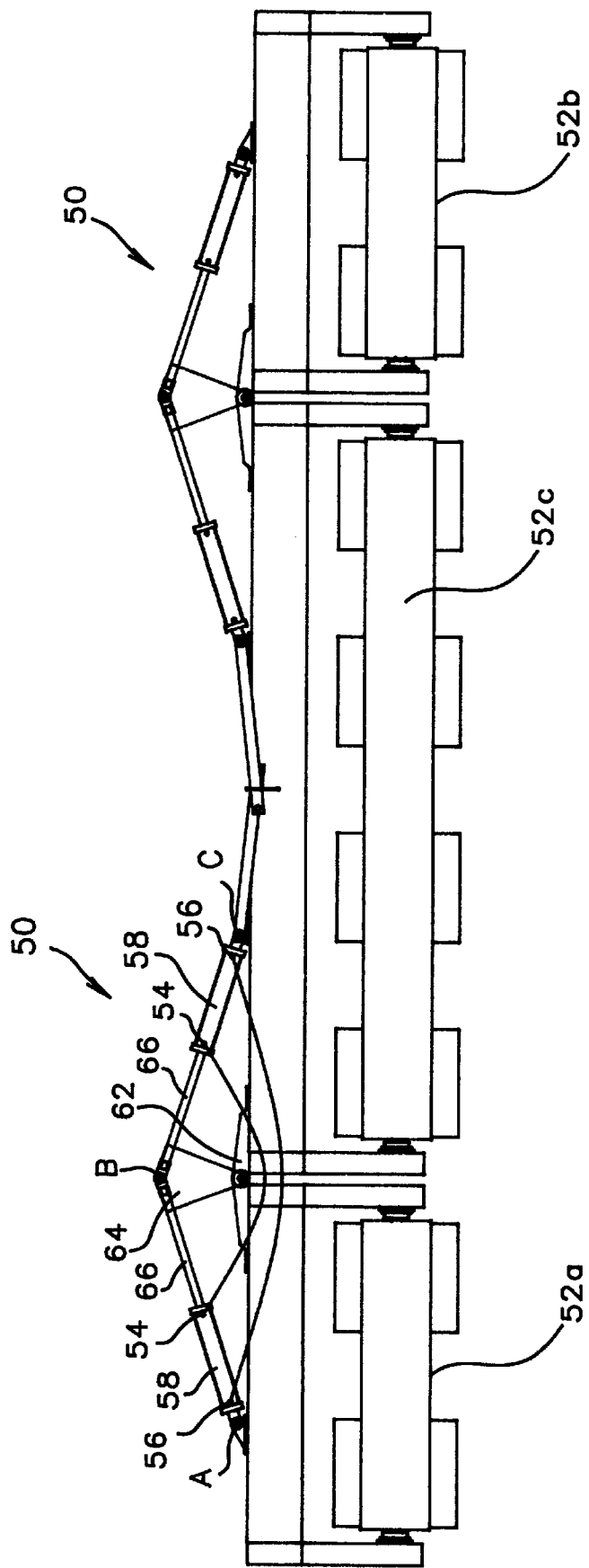
FIG. 5 is a rear view of a further embodiment of the stalk puller and chopper of the present invention, shown in an operating position.

Referring to FIGS. 5 and 6, a rotation system 50 is illustrated for allowing the end sections 52a, 52b to rotate more than ninety degrees from the horizontal about a center section 52c. Rotation system 50 includes, for each end section, two cylinders 58, 60, each having upper and lower cylinder fluid ports 54, 56. Cylinder fluid ports 54 are connected to a first hydraulic fluid source and cylinder fluid ports 56 are connected to another hydraulic fluid source. The cylinders 58, 60 therefore push or pull in unison with identical force and are actuated by a single hydraulic control valve to pivot about a hinge 62 which connects each of the end sections 52a, 52b to the center section 52c. A pivoting member 64 is provided to direct the forces from the hydraulic cylinders 58, 60 and thereby cause the end section 52a to pivot about the hinge 62. The pivoting member 64 also serves as a stop on which the end sections 52a, 52b will rest when the cylinders are retracted, as shown in FIG. 6 and discussed further below. While only discussed in detail with respect to the end section 52a, it should be apparent that an identical rotating system 50 is provided on the other end of the apparatus for also rotating end section 52b.

Fluid pressure applied to cylinder fluid ports 54 cause the piston rods 66 to retract with equal force through the pivot points A, B, C, as shown in the operating position of FIG. 5. As they retract under load and pass a location where the angle of the piston rods 66 connecting pivot point B is ninety degrees relative to the hinge 62 and the frame pivot points A and C, the pivoting member 64 tends to move toward a position that is equal relative to the cylinder frame connecting points A and C. The torque about the hinge 62 is greatest at ninety degrees and decreases as the angle then becomes larger or smaller.

The end section 52a may rotate two degrees below the horizontal relative to the center section 52c when the hydraulic control valve (not shown) is set to a float position. The pivoting member 64 can rotate approximately seventy-one degrees about the hinge 62 due to the force from cylinder 58, with cylinder 60 also being able to rotate the pivoting member 64 approximately seventy-one degrees. Thus, the total rotation of end section 52a about the hinge 62 is approximately one hundred forty-two degrees.

When both cylinders 58, 60 are fully retracted, as shown in the transport position of FIG. 6, the end section 52a rests on the pivoting member 64 and the pivoting member 64 rests on the center section 52c of the apparatus. The center of gravity of the end section 52a is to the right, or disposed inward of, the hinge 62, therefore, no fluid pressure is required to hold the end section 52a in the illustrated transport position. A safety strap 68 may also be attached, however, in the event that the tractor hydraulic system may leak. Potential hazards associated with the end sections leaking back downward, as is inherent in the prior art, is thus eliminated.

The rotating system 50 of the present invention includes the pivoting member 64 which allows two cylinders 58, 60 to be used for rotation instead of only the one cylinder employed in conventional systems. Further, since only approximately seventy-one degrees of rotation must be provided by each cylinder, rather than the ninety degrees or more in conventional systems, more favorable crank angles may be used. The maximum force required to rotate the end section 52a through approximately one hundred forty-two degrees of rotation is much less than that required to rotate single cylinder systems only ninety degrees. Furthermore, a lighter frame and simpler cylinder attaching components result in lower fabrication costs and eliminate unnecessary machine weight. Lower hydraulic cylinder force requirements also allow the use of ASAE standard pull type farm implement universal hitch cylinders. Two such standard cylinders costing generally much less than the single cylinder used on conventional systems to rotate only ninety degrees the end sections of comparable size implements. In addition, since the end sections 52a, 52b are not integral with the center section 52c but hingedly connected thereto and are not attached to any tractor hitch, each section can float or traverse independently over uneven land or terraces. End sections 52a, 52b do have their own power supply from the rotation of the rotors, as described above.

Thus, the rotating system 50 of the present invention provides a more compact unit for transport having a lesser width than that achieved through conventional ninety degree rotation systems. The rotating system 50 also achieves a more stable configuration for transport by rotating the end sections approximately one hundred forty two degrees such that the center of gravity of the end section is disposed inward of the effective outer pivot point. The use of the pivoting member in combination with two hydraulic cylinders also decreases the overall cost of the required cylinders while improving the efficiency of the same.

While the present invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An apparatus for processing plant stalks after harvesting, said apparatus comprising:

a frame structure supported from a ground surface for translatory movement at a predetermined rate and in a predetermined direction along a row of plant stalks;

at least one pair of pneumatic tires having their peripheries in pressure contact with each other and thus forming a nip for receiving plant stalks therein, said rotating pneumatic tires being disposed at a predetermined angle relative to the ground surface such that a lower portion of said nip precedes an upper portion of said nip during movement of said frame structure, and means to control said pair of pneumatic tires to rotate at a peripheral speed which is fixed in relation to the translators movement of said frame structure;

wherein the peripheral speed of said pneumatic tires at said nip is less than the rate of movement of said frame structure, said nip of said pneumatic tires thereby grasps the plant stalks for a sufficient period of time and for a sufficient distance of movement of said frame structure such that the plant stalks are pulled from the ground surface with their roots substantially attached thereto.

2. The apparatus of claim 1 wherein the peripheral speed of said pneumatic tires is approximately fifty percent to seventy-five percent of the rate of movement of said frame structure.

3. The apparatus of claim 2 wherein the peripheral speed of said pneumatic tires is approximately sixty-two percent of the rate of movement of said frame structure.

4. The apparatus of claim 1 further comprising a chopper assembly provided in alignment with said at least one pair of pneumatic tires, said chopper assembly chopping the plant stalks after they are pulled from the ground.

5. The apparatus of claim 4 wherein said chopper assembly includes a plurality of chopper blades extending from a central chopper cylinder.

6. The apparatus of claim 4 wherein said chopper assembly supports said frame structure from the ground surface, said chopper assembly engaging the ground surface during movement of said frame structure.

7. The apparatus of claim 6 further comprising a drive assembly connecting said chopper assembly and said at least one pair of pneumatic tires, wherein rotation of said chopper assembly during movement of said frame structure actuates said drive assembly and thereby drives said at least one pair of pair of pneumatic tires in rotation.

8. An apparatus for pulling and chopping plant stalks after harvesting, said apparatus comprising:

a frame structure supported from a ground surface for translatory movement at a predetermined rate and in a predetermined direction along a row of plant stalks;

at least one pair of rotating elements forming a nip for receiving plant stalks therein, said rotating elements being disposed at a predetermined angle relative to the ground surface such that a lower portion of said nip precedes an upper portion of said nip during movement of said frame structure, and said pair of rotating elements being rotated at a predetermined rotation speed, said nip of said rotating elements thereby grasps the plant stalks for a sufficient period of time and for a sufficient distance of movement of said frame structure such that the plant stalks are pulled from the ground surface with their roots substantially attached thereto;

a chopper assembly drivingly connected and disposed in alignment with said at least one pair of rotating elements, said chopper assembly chopping the plant stalks after they are pulled from the ground;

wherein said chopper assembly engages the ground surface during movement of the frame structure and thereby provides rotational drive to said at least one pair of rotating elements.

9. The apparatus of claim 8 wherein the predetermined rotation speed of said rotating elements is less than the predetermined rate of movement of said frame structure.

10. The apparatus of claim 9 wherein said rotating elements comprise pneumatic tires.

11. The apparatus of claim 8 wherein said chopper assembly includes a cylinder and a plurality of rotor blades extending therefrom, said rotor blades providing a ground engaging surface for the chopper assembly.

12. The apparatus of claim 8 wherein said chopper assembly includes a center section and at least one end section, said apparatus further comprising means for rotating said at least one end section about a hinge more than ninety degrees relative to a horizontal plane of said center section in order to obtain a transport position of said end section disposed substantially over said center section.

13. A method of processing plant stalks after harvesting, said method comprising the steps of:

providing a frame structure for moving along a row of plant stalks to be processed;

rotating pair of pneumatic tires carried by said frame structure at a predetermined peripheral speed which is fixed in relation to movement of said frame structure;

gathering the plant stalks between a pinch point of the pair of pneumatic tires;

advancing the frame structure along the row at a predetermined advancing speed, the advancing speed being greater than said peripheral rotation speed; and pulling the plant stalks from the ground surface with the roots thereof substantially attached.

14. The apparatus of claim 8 wherein said chopper assembly includes a central cylinder and a plurality of rotor blades extending outwardly and circumferentially spaced around said cylinder to define a plurality of cylinder segments between said blades; a plurality of blade holder and deflector assemblies mounted on said cylinder segments, said assemblies comprising a diagonal member extending between a blade and a cylinder segment, said diagonal members being positioned to deflect a served plant stalk from an area between two adjacent rotor blades.

* * * * *